(12) United States Patent
Lin

(10) Patent No.: US 9,074,928 B2
(45) Date of Patent: Jul. 7, 2015

(54) OPTICAL CONNECTOR WITH ENHANCING PINS SECURING SHELL ON CIRCUIT BOARD

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 273 days.

(21) Appl. No.: 13/714,323

(22) Filed: Dec. 13, 2012

(65) Prior Publication Data

US 2014/0084190 A1 Mar. 27, 2014

(30) Foreign Application Priority Data

Sep. 26, 2012 (TW) .............................. 101135242 A

(51) Int. Cl.
H01J 5/02 (2006.01)
G01J 1/02 (2006.01)
G01J 1/04 (2006.01)
G02B 6/42 (2006.01)
G02B 6/36 (2006.01)

(52) U.S. Cl.
CPC ............. *G01J 1/0271* (2013.01); *G01J 1/0411* (2013.01); *G01J 1/0209* (2013.01); *G02B 6/428* (2013.01); *G02B 6/3652* (2013.01); *G02B 6/4214* (2013.01); *G02B 6/4231* (2013.01); *G02B 6/4246* (2013.01); *G02B 6/425* (2013.01)

(58) Field of Classification Search
CPC ...................................................... G01J 1/0271
USPC ........................................ 250/239; 385/88, 92
See application file for complete search history.

(56) References Cited

U.S. PATENT DOCUMENTS 7,578,623 B2 * 8/2009 Wang et al. ..................... 385/88
8,737,784 B2 * 5/2014 Kawai .............................. 385/47

FOREIGN PATENT DOCUMENTS

WO    WO2010/098395    *    9/2010

* cited by examiner

*Primary Examiner* — Thanh Luu
(74) *Attorney, Agent, or Firm* — Novak Druce Connolly Bove + Quigg LLP

(57) ABSTRACT

An optical connector includes a circuit board, at least one light emitter, at least one light receiver, a shell, and at least two enhancing pins. The circuit board includes a mounting surface. The at least one light emitter and at least one light receiver are mounted on the mounting surface. The shell covers the at least one light emitter and the at least one light receiver. The at least two enhancing pins passes through the shell and are received in the circuit board to fix the shell on the mounting surface.

18 Claims, 6 Drawing Sheets

OPTICAL CONNECTOR WITH ENHANCING PINS SECURING SHELL ON CIRCUIT BOARD

BACKGROUND

1. Technical Field

The present disclosure relates to an optical connector.

2. Description of Related Art

An optical usually includes a circuit board, a number of light emitters, a number of light receivers, and a shell. The light emitters and the light receivers are mounted on and electrically connected to the circuit board. The shell includes a number of lenses and is adhered to the circuit board by adhesive. Each of the light emitters and light receivers is precisely aligned with a corresponding lens. In use, light beams emitted by each light emitter project into the shell through a corresponding lens and then emit out from the shell. External light beams project into the shell, pass through a corresponding lens, and then project to a light receiver. Because the shell is adhered to the circuit board by the adhesive and usually the adhesive is not strong enough, it is readily to move the shell when an external force is applied and results in misalignment between the lenses and the light emitters and the light receivers.

DETAILED DESCRIPTION

Figure 1:
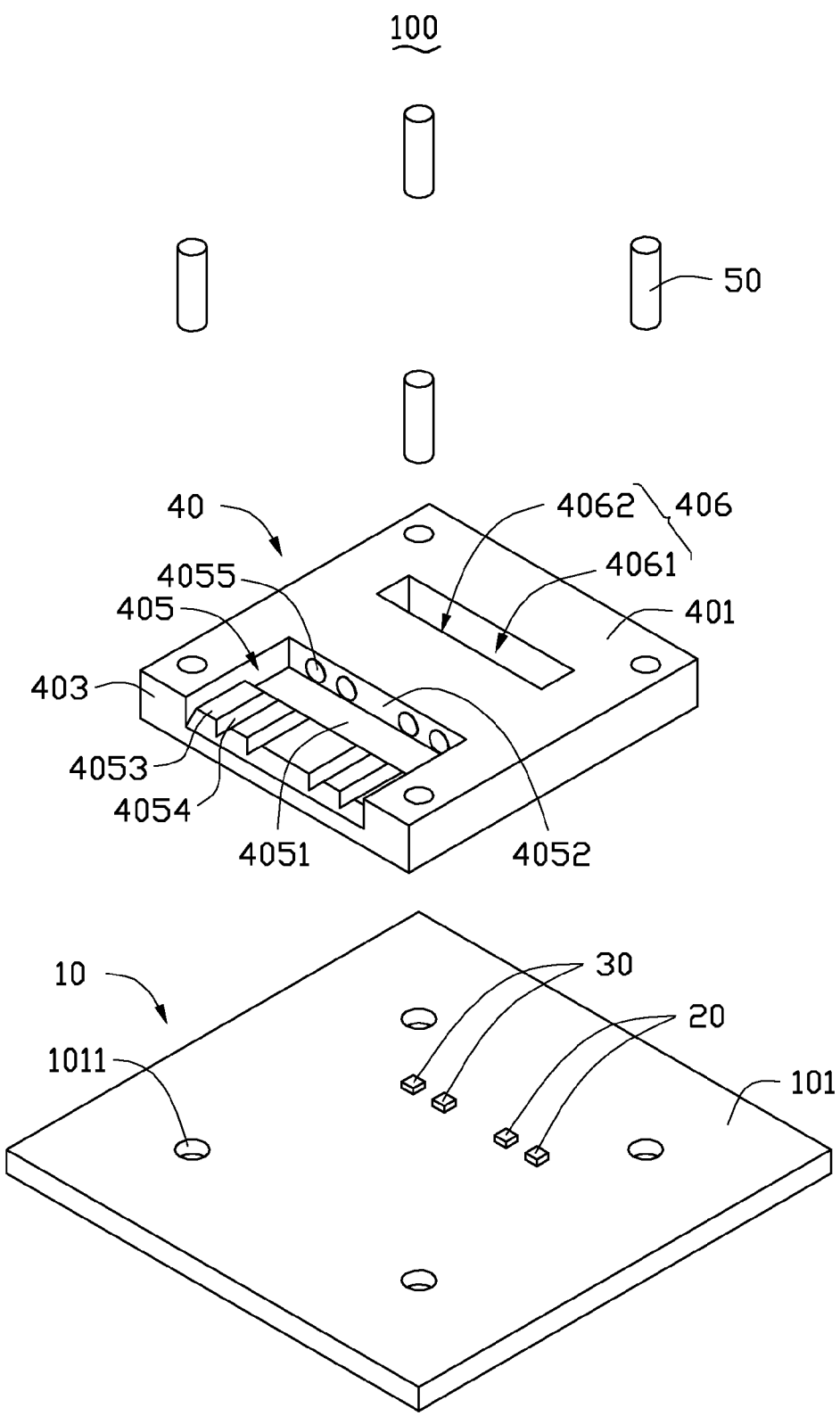
FIG. 1 is an exploded view of an optical connector, according to an exemplary embodiment.
Figure 2:
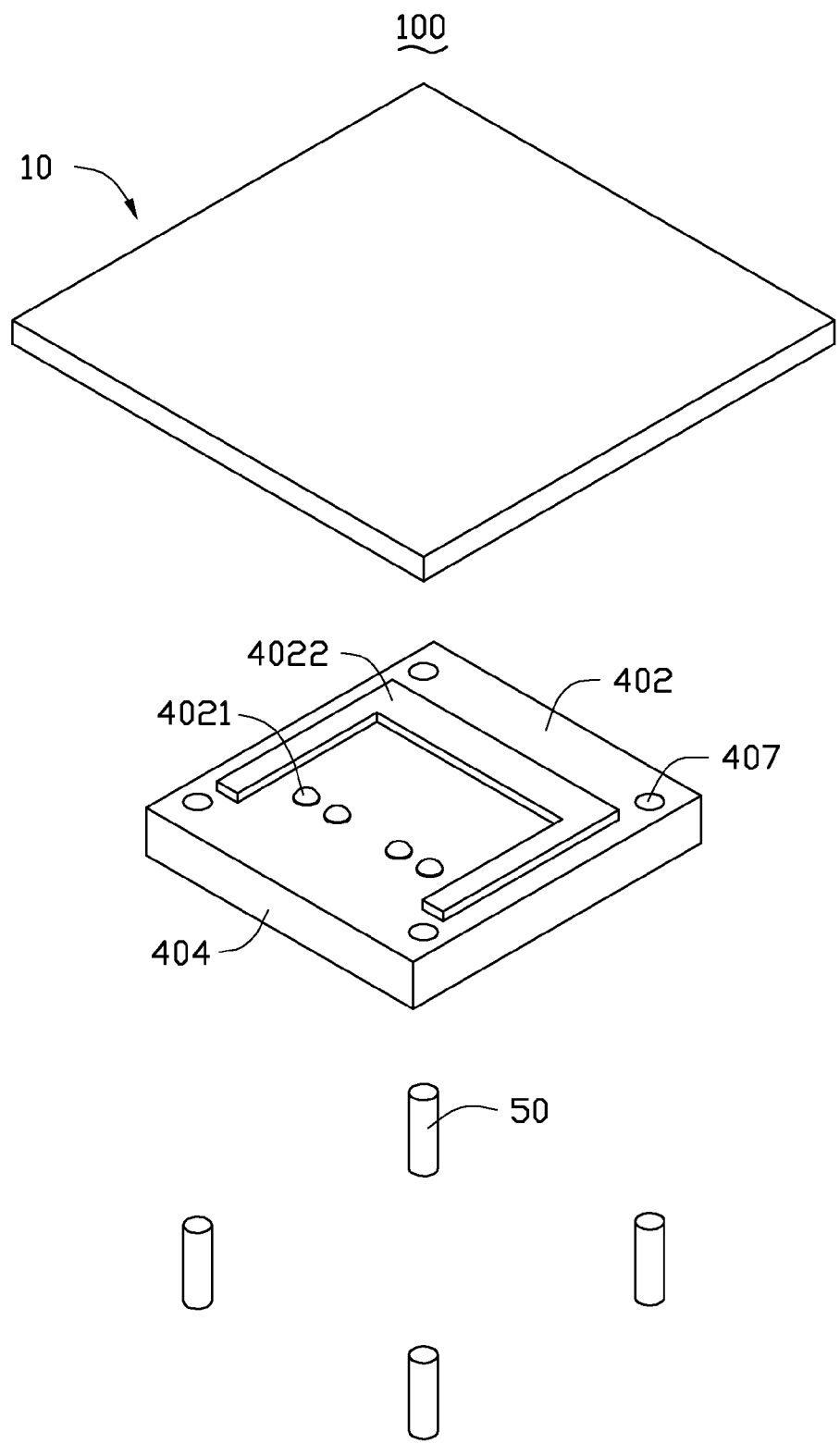
FIG. 2 is similar to FIG. 1, but viewed from another angle.
Figure 3:
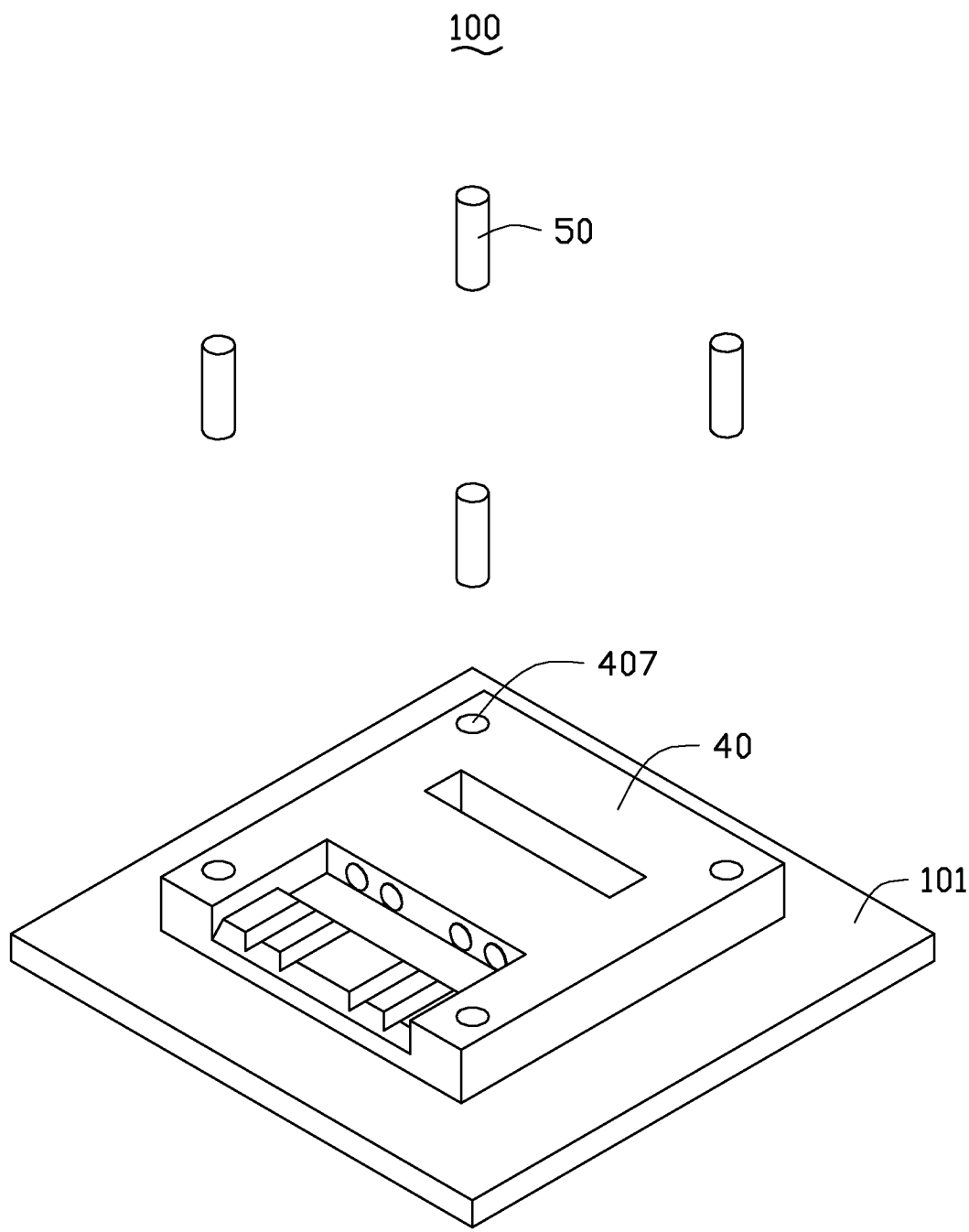
FIG. 3 is an isometric, partially assembled view of the optical connector of FIG. 1.
Figure 4:
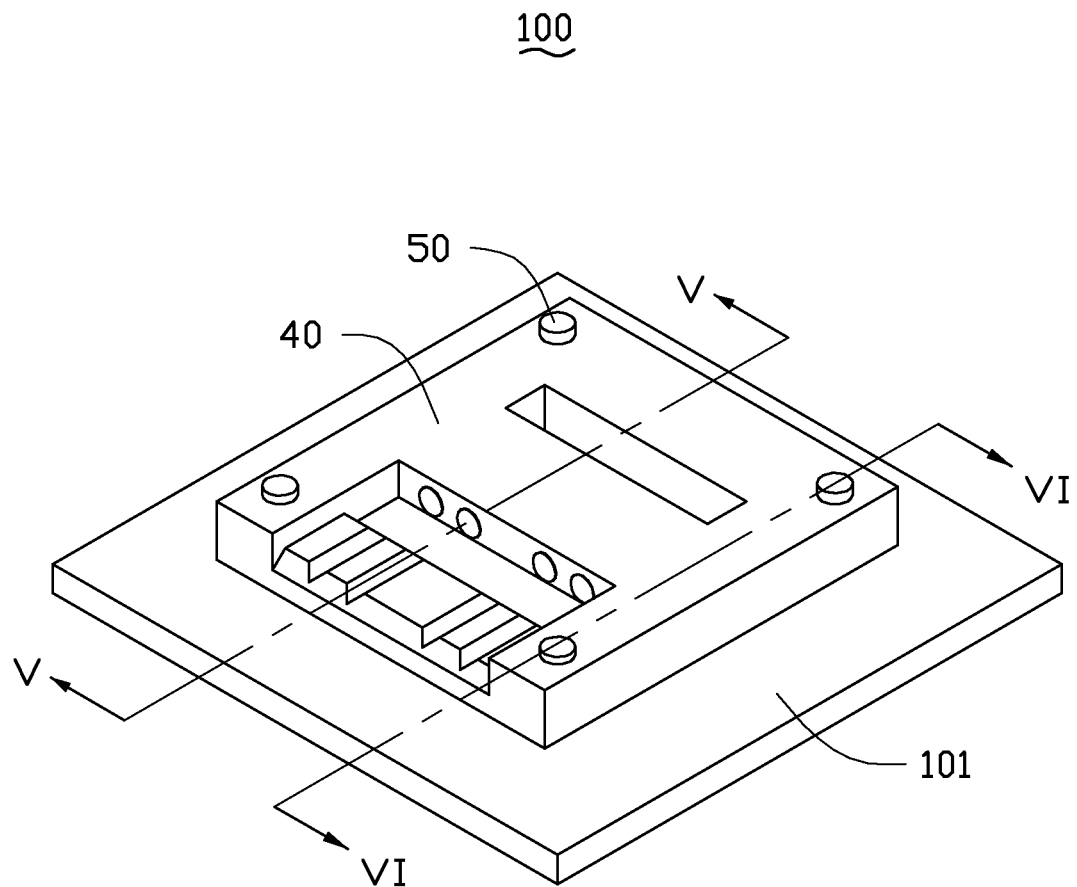
FIG. 4 is an isometric, assembled view of the optical connector of FIG. 1.

FIGS. 1 and 2 show an optical connector 100 according to an exemplary embodiment. The optical connector 100 includes a circuit board 10, at least one light emitter 20, at least one light receiver 30, a shell 40, and a number of enhancing pins 50.

The circuit board 10 includes a mounting surface 101. The at least one light emitter 20 and the at least one light receiver 30 are mounted on the mounting surface 101 and electrically connected with the circuit board 10. The at least one light emitter 20 and the at least one light receiver 30 are distributed in a line. In the embodiment, the numbers of the at least one light emitter 20 and the at least one light receiver 30 are both two. Each light emitter 20 is a laser diode (LD) for emitting light beams. Each light receiver 30 is a photodiode (PD) for receiving light beams.

The circuit board 10 defines a number of mounting holes 1011 in the mounting surface 101. In the embodiment, the mounting holes 1011 are blind holes and the number of the mounting holes 1011 is four. The four mounting holes 1011 are distributed at four corners of a rectangle (not shown) and surround the light emitters 20 and the light receivers 30.

The shell 40 is made of transparent plastic and is substantially cuboid. The shell 40 includes a top surface 401, a bottom surface 402 opposite to the top surface 401, a first end surface 403, and a second end surface 404 opposite to the first end surface 403. The first end surface 403 and the second end surface 404 perpendicularly connect the top surface 401 and the bottom surface 402. The top surface 401 defines a first groove 405 and a second groove 406. The first groove 405 is positioned adjacent to the first end surface 403 and passes through the first end surface 403. The first groove 405 is cuboid and includes a first cut-out surface 4051 parallel to the top surface 401 and a second cut-out surface 4052 parallel to the first end surface 403. A protrusion 4053 extends up from the first cut-out surface 4051 adjacent to the first end surface 403. The protrusion 4053 defines a number of V-shaped mounting grooves 4054 arranging along a direction perpendicular to the first end surface 403. In the embodiment, the number of the mounting grooves 4054 is four, each of which is used to receive a fiber (not shown). A number of the first lenses 4055 extend up from the second cut-out surface 4052. The first lenses 4055 are convex lenses and distributed in a line and spaced from one another. In the embodiment, the number of the first lenses 4055 is four and each first lens 4055 corresponds to a mounting groove 4054.

The second groove 406 is positioned adjacent to the second end surface 404. The second groove 406 includes a vertical surface 4061 parallel to the second end surface 404 and a slanted surface 4062 directly connected to the vertical surface 4061. An included angle between the vertical surface 4061 and the slanted surface 4062 is about 45 degrees. An optical axis of each first lens 4055 intersects with the slanted surface 4062 and an included angle between the optical axis of each first lens 4055 and the slanted surface 4062 is about 45 degrees.

The shell 40 further defines a number of through holes 407 passing through the top surface 401 and the bottom surface 402. In the embodiment, the number of the through holes 407 is four and the four through holes 407 are generally distributed at four corners of the shell 40. Each through hole 407 corresponds to a mounting hole 1011. A diameter of each through hole 407 also corresponds to a diameter of each mounting hole 1011.

The shell 40 further includes a number of second lenses 4021 and a supporting portion 4022 extending up from the bottom surface 402. The second lenses 4021 are convex lenses and distributed in a line. In the embodiment, the number of the second lenses 4021 is four. An optical axis of each second lens 4021 intersects the optical axis of each first lens 4055 on the slanted surface 4062. An included angle between the optical axis of each second lens 4021 and the slanted surface 406 is also about 45 degrees. The supporting portion 4022 is substantially in a U shape and surrounds the second lenses 4021. A height of the supporting portion 4022 along a direction perpendicular to the bottom surface 402 is greater than a height of each second lens 4021.

Each of the enhancing pins 50 is cylindrical and can be made of plastic or metal. In the embodiment, the enhancing pins 50 are made of plastic. The number of the enhancing pins 50 is four. A diameter of each enhancing pin 50 corresponds to or slightly less than the diameter of each mounting hole 1011.

Referring to FIGS. 3 to 6, when assembling the optical connector 100, the bottom surface 402 faces the mounting surface 101, and the supporting portion 4022 is attached to the mounting surface 101. Each of the light emitters 20 and the light receivers 30 is optically aligned with a corresponding second lens 4021 and each through hole 407 is aligned with a mounting hole 1011. Therefore the shell 40 covers the at least one light emitter 20 and the at least one light receiver 30. Each enhancing pin 50 is passed through a corresponding through hole 407 and is cooperatively received by a corresponding through hole 407 and a corresponding mounting hole 1011, namely each enhancing pin 50 is engaged with the circuit board 10 and the shell 40. Therefore the shell 40 is steadily fixed on the circuit board 10. It is can avoid misalignment between the light at least one emitter 20, the at least one light receiver 30 and the second lenses 4021 when an external force is applied on the shell 40.

In order to more steadily fix the shell 40 on the circuit board 10, adhesive 60 can be utilized in the through holes 407 and/or the mounting holes 1011. In the embodiment, adhesive 60 is utilized both in the through holes 407 and the mounting holes 101. Each enhancing pin 50 is adhered in the corresponding through hole 407 and the corresponding mounting hole 1011.

Figure 5:
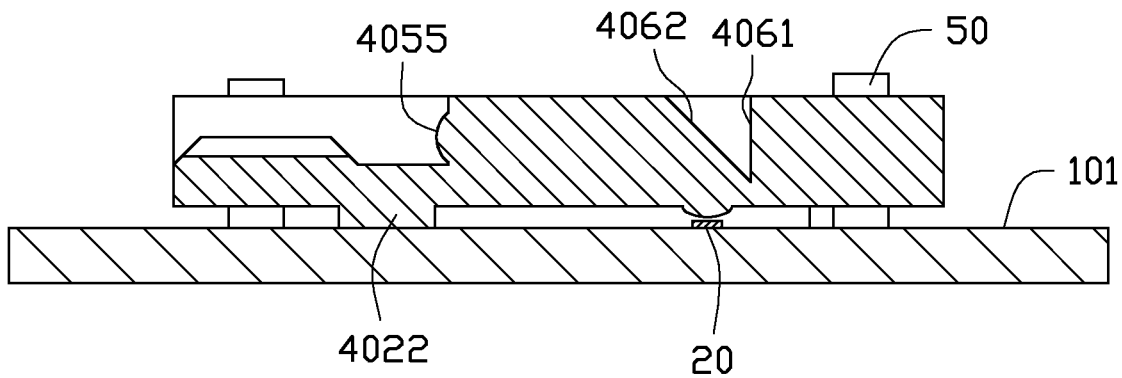
FIG. 5 is a cross-sectional view of the optical connector of FIG. 3, taken along line V-V.
Figure 6:
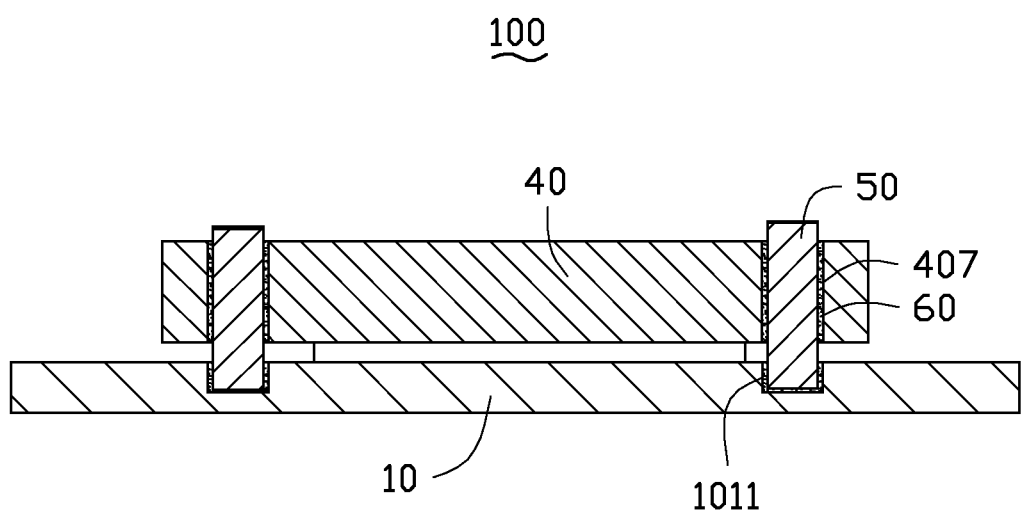
FIG. 6 is a cross-sectional view of the optical connector of FIG. 3, taken along line VI-VI.

Referring to FIG. 5, in use, each light emitter 20 emits light beams and projects the light beams to a corresponding second lens 4021. The second lens 4021 converges the light beams to the slanted surface 4062. Then the slanted surface 4062 reflects the light beam to a corresponding first lens 4055. The first lens 4055 converges the light beams and finally projects the lights to a corresponding fiber. A process for each light receiver 30 is substantially adverse to that of each light emitter 20.

The numbers of the light emitters 20 and the light receivers 30 are not limited in this embodiment, but can be set depending upon requirements. For example, in other embodiments, only one light emitter 20 and one light receive 24 are employed. Accordingly, the shell 40 includes two first lenses 4055 and two second lenses 4021.

In alternative embodiments, the mounting holes 1011 can be through holes.

In alternative embodiment, the enhancing pins 50 can be integrally formed with shell 40, for one example, each enhancing pin 50 extends up from the bottom surface 402 and corresponds to a mounting hole 1011.

The number of the enhancing pins 50 is not limited in this embodiment. For example, in other embodiments, at least two enhancing pins 50 are employed. Accordingly, the numbers of the mounting holes 1011 and the through holes 407 are equal to the enhancing pins 50.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical connector, comprising:
a circuit board comprising a mounting surface;
at least one light emitter and at least one light receiver mounted on the mounting surface;
a shell covering the at least one light emitter and the at least one light receiver, the shell comprising a top surface, a bottom surface opposite to the top surface, a first end surface perpendicular to the top surface, and a second end surface opposite to the first end surface, the shell defining a first groove and a second groove on the top surface, the first groove being adjacent to and passing through the first end surface, the first groove comprising a first cut-out surface parallel to the top surface and a second cut-out surface parallel to the first end surface, a plurality of first lenses extending up from the second cut-out surface, the second groove comprising a slanted surface, a plurality of second lenses extending up from the bottom surface, an optical axis of each first lens intersecting with an optical axis of each second lens on the slanted surface; and
at least two enhancing pins passing through the shell and received in the circuit board to fix the shell on the mounting surface.

2. The optical connector of claim 1, wherein the shell defines at least two through holes passing through the top surface and the bottom surface; the mounting surface defines at least two mounting holes, each mounting hole corresponds to and is aligned with a respective through hole; each enhancing pin is passed through a corresponding through hole and is cooperatively received by a corresponding through hole and a corresponding mounting hole.

3. The optical connector of claim 2, wherein adhesive is utilized in each through hole.

4. The optical connector of claim 2, wherein adhesive is utilized in each mounting hole.

5. The optical connector of claim 2, wherein the at least two mounting holes are blind holes.

6. The optical connector of claim 1, wherein an included angle between the optical axis of each first lens and the slanted surface and an included angle between the optical axis of each second lens the slanted surface are both about 45 degrees.

7. The optical connector of claim 1, wherein the shell comprises a protrusion extending up from the first cut-out surface adjacent to the first end surface, the protrusion defines a number of V-shaped mounting grooves arranging along a direction perpendicular to the first end surface.

8. The optical connector of claim 1, wherein the shell further comprises a substantially U shaped supporting portion extending up from the bottom surface, the supporting portion is attached on the mounting surface and surrounds the at least one light emitter and the at least one light receiver.

9. The optical connector of claim 1, wherein the number of the at least two enhancing pins is four.

10. The optical connector of claim 9, wherein the shell defines at least two through holes passing through the top surface and the bottom surface; the mounting surface defines at least two mounting holes, each mounting hole corresponds to and is aligned with a respective through hole; each enhancing pin is passed through a corresponding through hole and is cooperatively received by a corresponding through hole and a corresponding mounting hole.

11. The optical connector of claim 10, wherein adhesive is utilized in each through hole.

12. The optical connector of claim 10, wherein adhesive is utilized in each mounting hole.

13. The optical connector of claim 10, wherein the at least two mounting holes are blind holes.

14. An optical connector, comprising:
a circuit board comprising a mounting surface;
at least one light emitter and at least one light receiver mounted on the mounting surface;
a shell covering the at least one light emitter and the at least one light receiver, the shell comprising a top surface, a bottom surface opposite to the top surface, a first end surface perpendicular to the top surface, and a second end surface opposite to the first end surface, the shell defining a first groove and a second groove on the top surface, the first groove being adjacent to and passing through the first end surface, the first groove comprising a first cut-out surface parallel to the top surface and a second cut-out surface parallel to the first end surface, a plurality of first lenses extending up from the second cut-out surface, the second groove comprising a slanted surface, a plurality of second lenses extending up from the bottom surface, an optical axis of each first lens intersecting with an optical axis of each second lens on the slanted surface; and at least two enhancing pins;

wherein each enhancing pin is engaged with the shell and the circuit board to fix the shell on the mounting surface.

15. The optical connector of claim 14, wherein an included angle between the optical axis of each first lens and the slanted surface and an included angle between the optical axis of each second lens the slanted surface are both about 45 degrees.

16. The optical connector of claim 14, wherein the shell comprises a protrusion extending up from the first cut-out surface adjacent to the first end surface, the protrusion defines a number of V-shaped mounting grooves arranging along a direction perpendicular to the first end surface.

17. The optical connector of claim 14, wherein the shell further comprises a substantially U shaped supporting portion extending up from the bottom surface, the supporting portion is attached on the mounting surface and surrounds the at least one light emitter and the at least one light receiver.

18. The optical connector of claim 14, wherein the number of the at least two enhancing pins is four.

* * * * *